Aug. 5, 1958 W. T. CARDWELL, JR 2,845,793
APPARATUS FOR DETERMINING THE RATE OF
SETTLING OF SUSPENSIONS
Filed June 18, 1954 2 Sheets-Sheet 1

INVENTOR
WILLIAM T. CARDWELL, JR.
BY
ATTORNEYS

Aug. 5, 1958 W. T. CARDWELL, JR 2,845,793
APPARATUS FOR DETERMINING THE RATE OF
SETTLING OF SUSPENSIONS
Filed June 18, 1954 2 Sheets-Sheet 2

INVENTOR
WILLIAM T. CARDWELL, JR.
BY *A. L. Snow*
*Ralph L. Freeland Jr.*
ATTORNEYS

United States Patent Office 2,845,793
Patented Aug. 5, 1958

2,845,793

APPARATUS FOR DETERMINING THE RATE OF SETTLING OF SUSPENSIONS

William T. Cardwell, Jr., Whittier, Calif., assignor to California Research Corporation, San Francisco, Calif., a corporation of Delaware Application June 18, 1954, Serial No. 437,837

4 Claims. (Cl. 73—53)

The present invention relates to an apparatus for determining the rate of settling of suspensions, and more particularly relates to apparatus for determining the rate of settling of the solid particles of an opaque suspension, and has for an object the provision of an apparatus for determining the settling rate of such particles by measuring the change in the period of oscillation of a body of said suspension having a fixed volume when supported to pivot about one or more selected horizontal axes above the initial center of mass of said body when subjected to at least two different conditions of settling.

In the drilling of oil wells by rotary methods, it is customary to use a drilling fluid for lubrication of the rotary bit, washing out cut particles of rock and controlling the hydrostatic head at the bottom of the well bore. The physical and chemical properties of the drilling fluid or mud must be carefully controlled at all times to insure the proper functioning of the fluid to perform these chores. One of the physical properties of drilling mud which is quite critical is the rate of settling of the solid particles from the suspension of solids-in-liquid. The solid materials may be purposely added to the fluid to give it proper density, viscosity, and other desirable physical properties, while other materials, such as salt, sand, or other debris, are inadvertently entrained during drilling.

When water-base drilling fluids are employed, the settling rate of the solids may usually be determined readily by optical observation of a sample of the fluid at different time intervals. Recently, oil-base drilling fluids have come into wider use due to their many practical advantages over water-base fluids in the drilling of oil wells. One of the primary reasons for using oil-base fluids is to avoid water-blocking of oil-producing formations. However, optical methods are not satisfactory for testing the settling rate of such fluids due to their opaqueness to light. This opaqueness is due primarily to the use of dark oils and asphalts in the compounding of oil-base drilling muds.

In accordance with one aspect of the present invention, there is provided an apparatus for determining the settling rate of a suspension, whether opaque or not, but particularly useful with opaque suspensions, wherein the settling rate may be determined manually or automatically by measuring the change in the center of mass of a freely-oscillating volume of said suspension over a period of time sufficiently long to permit the center of mass to shift due to settling of the solid particles.

In accordance with another aspect of the present invention, there is provided an apparatus for measuring the shift in the center of mass of a fixed volume of a solid-in-liquid suspension, as a measure of the settling rate of the solid particles by pivotally supporting said fixed volume of the suspension about at least two different selected horizontal axes, each of which is above and a different distance from the original center of mass of said volume.

Figure 1:
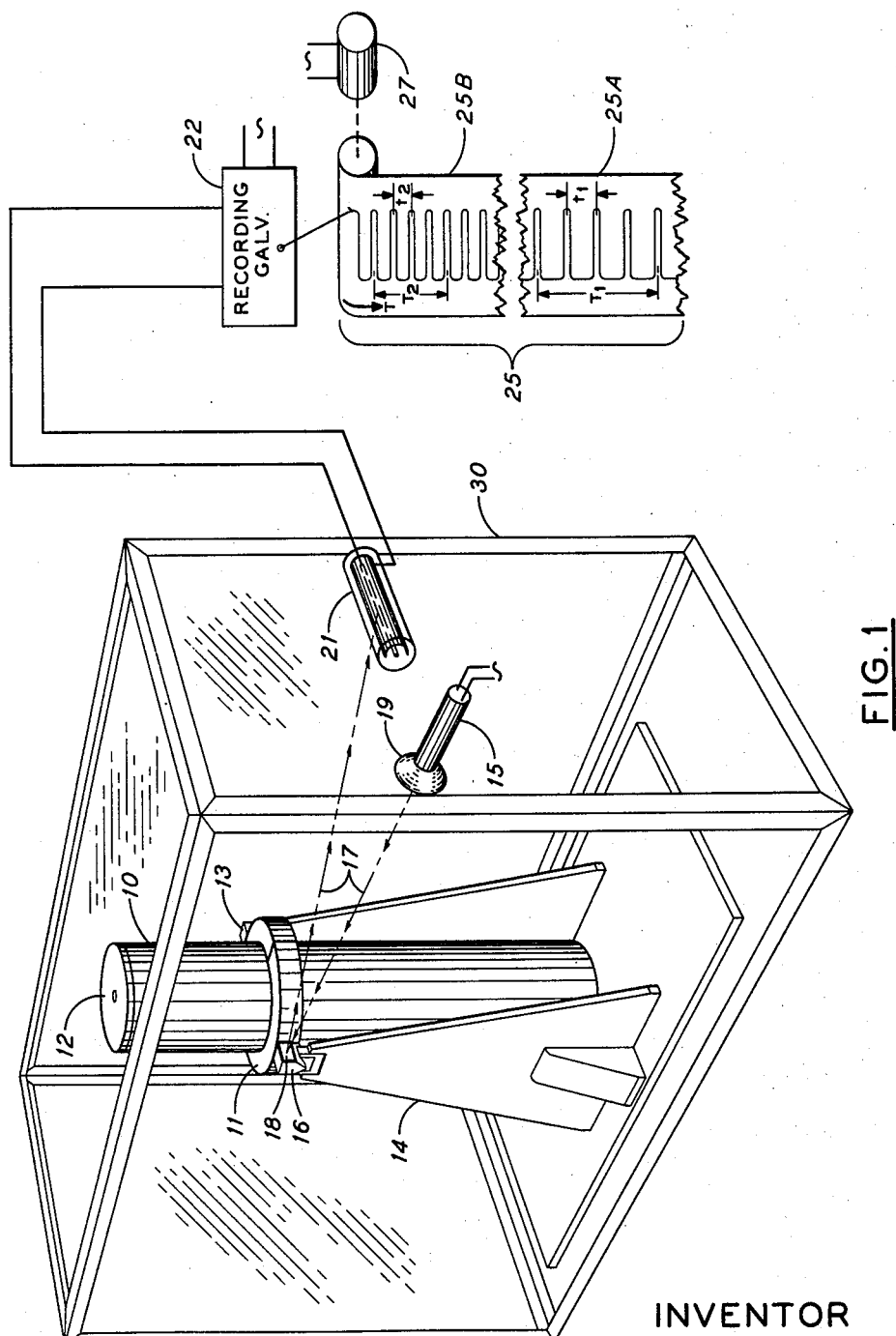
Fig. 1 is a schematic diagram of one form of apparatus for carrying out the present invention, which permits the measurement and recording to be performed automatically, by recording the change in the period of oscillation for a fixed volume of a suspension as settling progresses.

Referring now to the drawings, and in particular to Fig. 1, there is illustrated one form of apparatus for carrying out the present invention. As there shown, a liquid suspension whose settling rate is to be determined is adapted to be supported to pivot about a selected horizontal axis above its center of mass in an elongated tube 10 of fixed volume. Tube 10 is preferably constructed of aluminum, magnesium or other very light-weight metal so that the total weight of the confining tube will contribute as little as possible to the total weight of the body under observation. The measurement of the shift in the center of gravity or mass of the suspension itself which is to be tested therein is thus facilitated.

Figure 3:
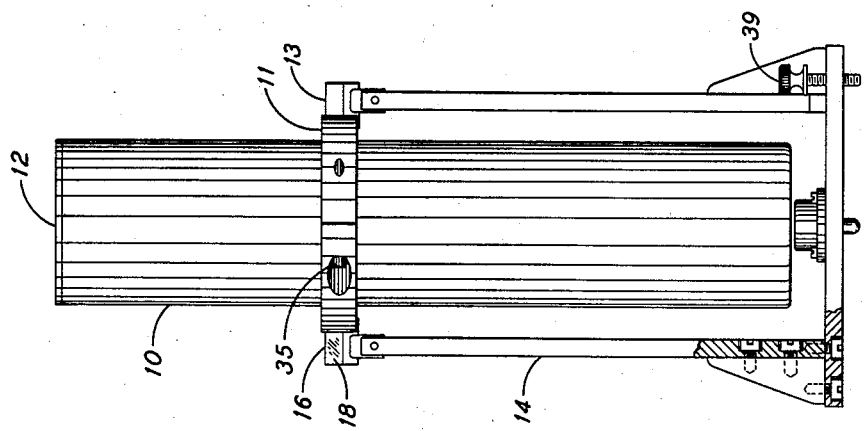
Fig. 3 is a side elevation view taken from the right side of the apparatus shown in Fig. 2.
Figure 2:
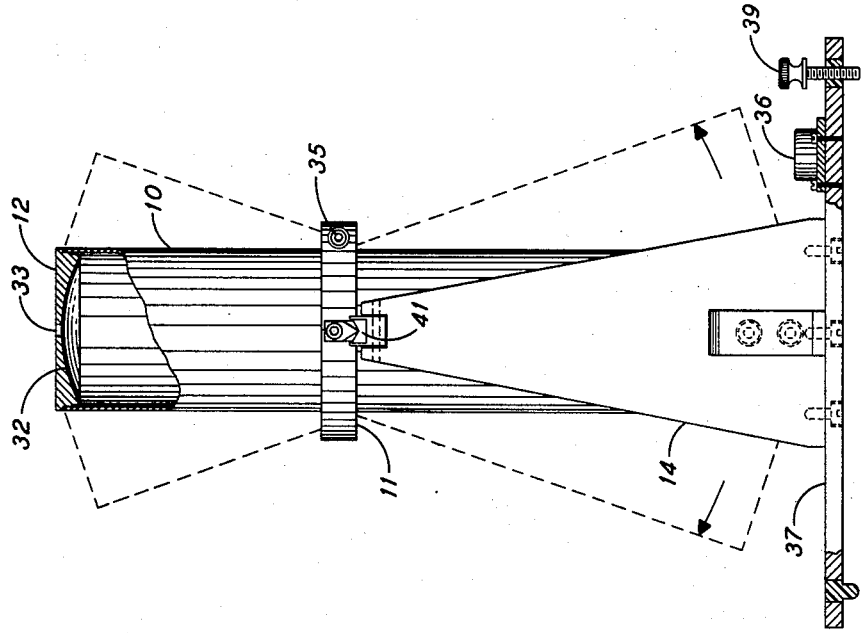
Fig. 2 is a front elevation view, partially in section, of a preferred form of apparatus, which may be used for either the manual or automatic performance of the present invention.
Figure 4:
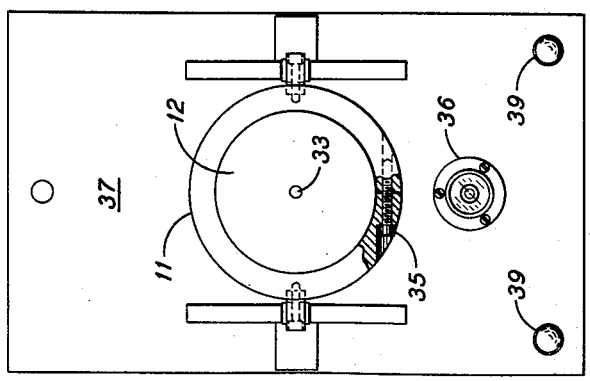
Fig. 4 is a plan view of the apparatus illustrated in Figs. 2 and 3.

In the embodiment shown in Fig. 1, as well as in Figs. 2 to 4, inclusive, the confining body for the suspension is made of thin-walled aluminum tubing and provided with a slidable collar 11 positioned slightly above the center of mass of both the body under test and the empty tube 10. The combined center of gravity or mass of tube 10 and the suspension is also affected by the cap 12, which assures that a fixed volume of suspension of predeterminable magnitude is confined within the freely-oscillable tube 10 for each measurement of the settling rate. Collar 11 also provides a means for mounting a pair of steel knife edges 13 and 16 in a line perpendicular to the longitudinal axis of tube 10, to permit the body of fluid to oscillate freely relative to the support stand, designated as 14, while resting on pivot supports 41, formed of agate or other hard material.

In the arrangement of Fig. 1, the rate of settling of an opaque suspension is arranged to be automatically indicated by focusing a beam of light 17 from lamp 15 on mirror 18, mounted on pivot 16, through a lens 19. By this arrangement, light beam 17 is reflected by mirror 18 so that it may be intercepted on each oscillation of the body of suspension by a photoelectric cell 21. Photocell 21 is connected to a recording galvanometer 22 which is arranged to record on chart 25 the impingement of light beam 17 on the conductive surface of photocell 21. With chart 25 being driven at a synchronous speed by drive motor 27, it will be seen that the body of suspension will have a period of oscillation, $t_1$, as indicated by the lower section, 25A, of chart 25, when first permitted to oscillate freely. After a predetermined interval of time, the period of oscillation of the body of fluid suspension will decrease to a time, $t_2$, as indicated in the upper part, 25B, of chart 25. Alternatively, the time required for a predetermined number of oscillations of the freely-swinging body of fluid-liquid suspension to occur may be measured. For example, five oscillations, in the time $T_1$, chart 25A, may be compared with the same number of oscillations after the solid particles have settled in the suspension, as indicated by the time, $T_2$, in section 25B of the chart.

Since the sensitivity of the instrument in recording the periodicity of the freely-swinging body will depend upon the pivot points 13 and 16 being positioned near the center of gravity of the composite body, including the fluid suspension, tubing 10, cap 12 and collar 11, there is desirably provided for the sensing unit a glass-enclosed case designated generally as 30. Such a case permits a constant temperature to be maintained throughout the test and likewise permits the oscillations of the body of fluid to be measured without interference by vagrant drafts or other movements of the air. From the foregoing automatic system of recording and indicating the settling rate of solid particles in a body of fluid, it will be apparent that similar measurements may be made by manually timing the time required for a predetermined number of oscillations at two or more intervals of time after the mixture has been confined in the supporting tube.

As mentioned hereinabove, the preferred form of apparatus for carrying out the present invention is particularly illustrated in Figs. 2 to 4. In this preferred form of apparatus, it will be observed that tube 10 and cap 12 have been formed so that the body of fluid and solid, whose settling rate is to be determined, is desirably formed as a pycnometric cylinder so that the volume of fluid placed therein may be substantially the same for all measurements made with the apparatus. To this end, cap 12 has its inner surface provided with a spherical or concave depression 32, particularly shown in Fig. 2, and, further, the cap is provided with an opening or riser 33 to permit fluid to escape from the tube through cap 12, which may be wiped clean.

As best seen in Fig. 4, collar 11 is formed as a split ring slidably engaging the outer surface of the cylinder 10 and is clamped thereto by screw 35, which passes through the two opposite sides of the split opening in collar 11. By this arrangement, the axis of oscillation of the tube and its contents may be adjusted at will with respect to the center of mass. This construction is particularly useful where the settling of the suspension is quite complicated; that is, where the rate of settling may vary nonlinearly with respect to time. Under these circumstances, a first determination of the settling rate may be made with the initial axis of oscillation positioned at one distance from the center of mass of the combined liquid and tube and then, immediately thereafter, a similar determination of settling rate made with the axis of oscillation at a different distance from the center of mass. These two determinations of the periods of oscillation are then compared with the periods of oscillation about the same axes after settling of the solid particles has occurred. Thus, when the separation is quite complex, two or more determinations of the shift in the center of mass may be used to characterize the rate of settling.

Level adjusting means for establishing the platform and pivot supports, designated generally as 14, in a level condition is provided by a spirit level 36 mounted upon base 37 and the two adjusting screws, designated as 39.

From the foregoing detailed description of the preferred construction of a freely-oscillable tube, wherein the settling rate of solid particles from a two-phase suspension is to be determined, it will be apparent that any fixed-volume type of container, whether of uniform cross-sectional area throughout its length or of different cross-sectional area, may be used in performing the method of the present invention. The difference between such uniform and non-uniform containers will of course be accounted for in the calibration of the container with known settling rates, as determined by correlations with known samples. Accordingly, it will be seen that the present invention is directed primarily to an apparatus for determining the settling or separation rate of a suspension of solid particles from a system of two or more phases, whether accomplished by the automatic means disclosed in Fig. 1 or by manual means as described hereinabove, by measurement of the time required for one or more oscillations of the freely-pivoted body under at least two different settling conditions.

It will be apparent to those skilled in the art that the readings indicated as $t_1$, $t_2$, or as $T_1$, $T_2$, may be readily converted by differentiating or integrating circuits into absolute numerical values which account both for the length of time required for the first and second readings to be made and the difference in periodicity over that period of time. This information may be either automatically registered by a meter or may be presented as absolute numbers, without the intervention of an operator. Hence, a final number value representing the rate of settling may be obtained entirely independent of an operator. Accordingly, it will be seen that the present invention may be accomplished entirely free of any mental operation, but the method as suggested above may be considerably shortened and simplified by the operator evaluating the settling rate from the change in the period of oscillation of the body of fluid suspension.

While numerous modifications and changes in both the apparatus and the manner of employing the apparatus of the present invention will occur to those skilled in the art, all such modifications and changes which fall within the scope of the appended claims are intended to be included therein.

I claim:

1. Apparatus for measuring the rate of settling of an opaque suspension comprising an elongated tubular cup member, means for pivotally supporting said cup member for oscillation about a selected axis above its center of mass with a pair of pivot points transversely disposed with respect to the major axis of said cup member and a cap member for confining a body of said suspension of predeterminable volume within said cup member and means for measuring the period of oscillation of said body of said suspension in said cup member under different conditions for the distribution of the liquid and solid components of said opaque suspension.

2. Apparatus for freely oscillating a predeterminable volume of settling opaque suspension to determine periods of oscillation for various conditions of settling of said suspension, comprising an elongated tubular cup member, means for oscillatably supporting said cup member on a selected transverse axis of said cup member, which selected axis intersects the longitudinal axis of said cup member but is displaced from the midpoint of said longitudinal axis, a cap member for confining said volume of suspension within said cup member, whereby with substantially uniform initial dispersion of the components of said suspension, said cup member when free to pivot will reach static equilibrium with its longitudinal axis in substantially a vertical position, and whereby there may be initiated free oscillations of said suspension and said cup member, which free oscillations will be sustained alone by the force of gravity for a sufficiently long period of time to allow a determination of the frequency of said free oscillations, and means for measuring the period of said free oscillations of said tubular cup member and the volume of suspension confined therein.

3. Apparatus for determining the rate of settling of a suspension comprising means for confining said suspension as an elongated body of fixed volume, means for oscillatably supporting said body on a selected transverse axis thereof, which axis is displaced from the transverse axis located midway between the ends of said body, and means for measuring the period of oscillation of said body, both in a first settling condition of said suspension existing immediately after confinement thereof, and, after a predeterminable time interval, in a second settling condition of said suspension, the difference in said periods of oscillation and the time between said measurements being an indication of the settling rate of said suspension.

4. Apparatus in accordance with claim 3 with the addition of means for moving the axis of oscillation from a first location above the center of mass of said body to a second location above the center of mass of said body, whereby, as a further determination of the rate of settling of said suspension, the determination of the difference in the period of oscillation between a first settling condition and a second settling condition may be made with said axis of oscillation in said second location.

References Cited in the file of this patent

UNITED STATES PATENTS

| | | |
|---|---|---|
| 1,002,106 | Witherell | Aug. 29, 1911 |
| 1,484,005 | Boekel | Feb. 19, 1924 |
| 1,792,013 | Hayes | Feb. 10, 1931 |
| 2,597,899 | Payne | May 27, 1952 |
| 2,635,462 | Poole et al. | Apr. 21, 1953 |